(12) United States Patent
Schuette et al.

(10) Patent No.: US 7,853,640 B2
(45) Date of Patent: Dec. 14, 2010

(54) KEY DISTRIBUTION

(75) Inventors: Glenn E. Schuette, Allen, TX (US);
Edward J. Russell, Plano, TX (US);
Curtis E. Miller, Wylie, TX (US);
Xinqun Zeng, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1636 days.

(21) Appl. No.: 10/935,811

(22) Filed: Sep. 7, 2004

(65) Prior Publication Data

US 2005/0055671 A1 Mar. 10, 2005

Related U.S. Application Data

(60) Provisional application No. 60/500,727, filed on Sep. 5, 2003.

(51) Int. Cl.
*G06F 15/16* (2006.01)
*G06F 9/44* (2006.01)

(52) U.S. Cl. ........................ 709/202; 717/172

(58) Field of Classification Search ............... 717/124, 717/172–178; 709/219, 202, 222, 226; 707/10; 705/10; 711/154
See application file for complete search history.

(56) References Cited

U.S. PATENT DOCUMENTS

| | | | | |
|---|---|---|---|---|
| 5,913,217 A | * | 6/1999 | Alger et al. | 707/101 |
| 6,009,525 A | * | 12/1999 | Horstmann | 726/22 |
| 6,532,588 B1 | * | 3/2003 | Porter | 717/170 |
| 7,260,635 B2 | * | 8/2007 | Pandya et al. | 709/226 |
| 2002/0138559 A1 | * | 9/2002 | Ulrich et al. | 709/203 |
| 2004/0143486 A1 | * | 7/2004 | Yeow et al. | 705/10 |

* cited by examiner

*Primary Examiner*—Nathan Flynn
*Assistant Examiner*—Chirag Patel
(74) *Attorney, Agent, or Firm*—Mima G. Abyad; Wade J. Brady, III; Frederick J. Telecky, Jr.

(57) ABSTRACT

The distribution of Bluetooth IDs among multiple integrated circuit testers at multiple sites for programming with a master database containing large size ID blocks, site operational databases with medium size ID blocks and tester programs with small size ID blocks provides reduced memory requirements and limits the chance of two units with a duplicate ID.

8 Claims, 1 Drawing Sheet

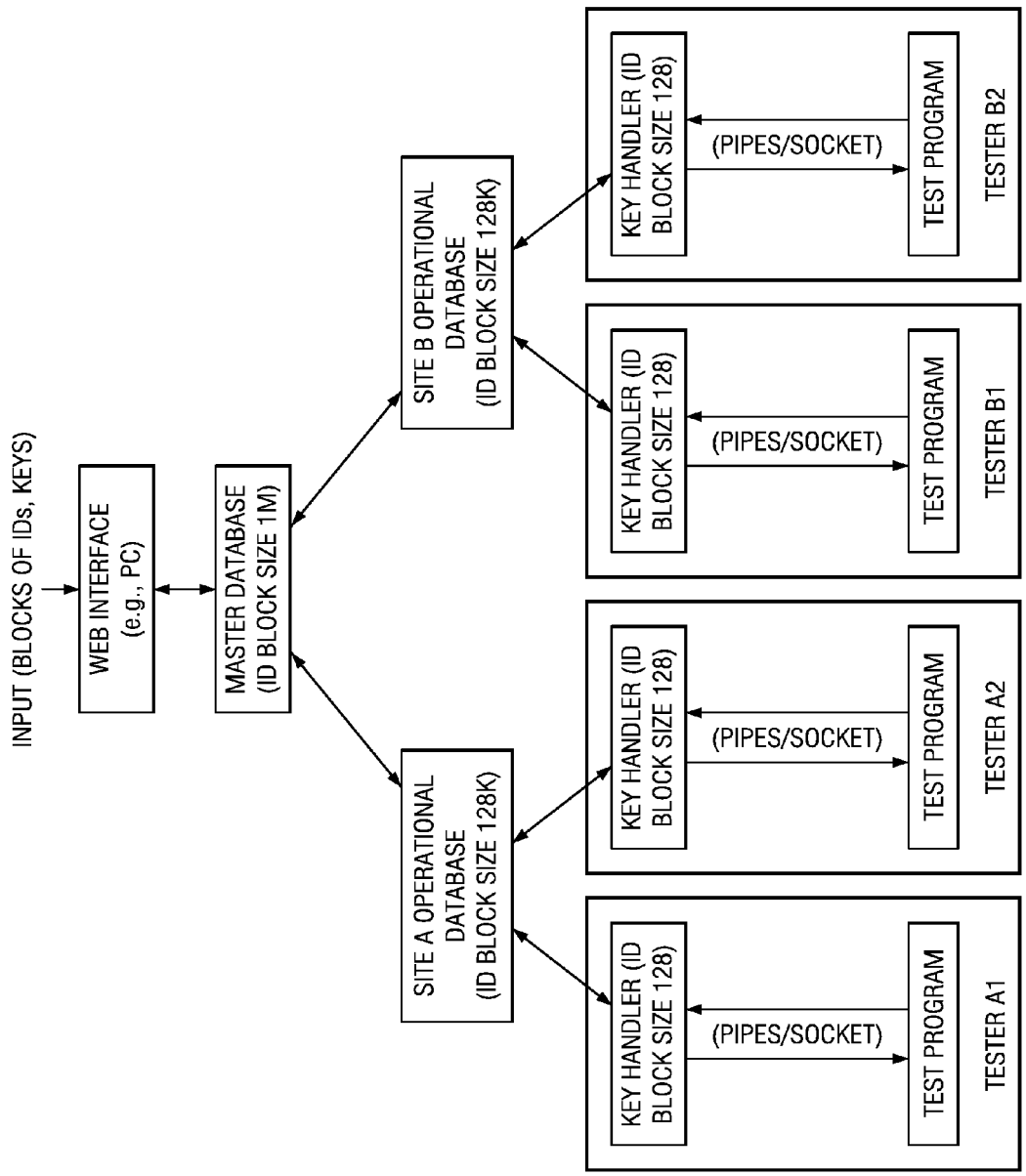

KEY DISTRIBUTION

CROSS-REFERENCE TO RELATED APPLICATIONS

The application claims priority from provisional patent application No. 60/500,727, filed Sep. 5, 2003.

BACKGROUND OF THE INVENTION

The present invention relates to integrated circuit manufacturing, and more particularly to distribution of circuit programming items.

Wireless communication systems, such as the Bluetooth standard, allow portable electronic devices to locally interact. However, to be distinguishable among multiple devices capable of receiving a transmission, each device typically has a unique identification number hardwired into its transceiver integrated circuits. Thus as part of the manufacturing process, an inventory of identification numbers must be available to be programmed into the integrated circuits. For Bluetooth, identification numbers are 48 bits long and blocks of 1M identification numbers can be purchased from organizations such as the IEEE.

Analogously, other systems require unique identification numbers such as integrated circuits with high-definition content protection (HDCP). Manufacturers typically program these identification numbers at the time of circuit testing (wafer probe or package test) and the programming involves electrically blowing fuses within the circuit or programming an EEPROM. Thus identification numbers should be readily available at any of possibly multiple testing sites with multiple testers at each site.

Additionally, an integrated circuit manufacturer's various customers (device vendors) may want their integrated circuits programmed with customer keys such as customer (or user) identifications and security features such as keys for DES and RC4 encryption systems. Customer keys are stored for use in integrated circuit manufacturing, although DES and RC4 keys typically are encrypted for secure storage and need to be decrypted at time of programming.

A single integrated circuit manufacturer with multiple testing sites and, possibly, with affiliated foundry manufacturers for the same products will thus have a problem of management and distribution for integrated circuit programming of unique identification numbers and customer keys required by multiple customers.

SUMMARY OF THE INVENTION

The present invention provides a hierarchical distribution system for integrated circuit programming items.

BRIEF DESCRIPTION OF THE DRAWINGS

FIG. 1 shows a system implementing a preferred embodiment.

DESCRIPTION OF THE PREFERRED EMBODIMENTS

1. Overview

Preferred embodiment methods provide for distribution of items, such as blocks of identification numbers, for programming integrated circuits as part of circuit testing. FIG. 1 illustrates a simple system of two sites with two automated testers at each site with each tester running various test software (e.g., tester automation and data collection tools); the testers blow electrical fuses to program a circuit. The preferred embodiments extend the tester software to provide automatic distribution of programming items from a master database through site operational databases to each tester as needed while maintaining tester throughput and limiting item inaccuracies.

2. First Preferred Embodiment

A first preferred embodiment method provides distribution of identification numbers (IDs) used in the Bluetooth wireless standard plus additional items, such as customer identifications and encryption keys, for an integrated circuit manufacturer which makes multiple products for various customers and, additionally, has contracted some work out to one or more foundries. Each pertinent site has multiple (e.g., 100) automatic testers for electrically testing each circuit (still in wafer form or already packaged), and these testers are also capable of electrically blowing fuses in circuits under test to program various items, from IDs to activation of redundant circuitry, during the testing. The contract foundries would have similar setups. Each tester runs various software tools (e.g., tester automation and data collection) so its operator can set the tester to automatically test each circuit, record test results, program (blow fuses) IDs for circuits which had tested as good, and so forth.

FIG. 1 illustrates a system where each tester at a site communicates with an operational database for the site. The tester downloads from the operational database blocks of Bluetooth IDs if Bluetooth circuits are under test, and customer identifications or other keys such as for DES, RC4, . . . encryption if circuits requiring these are under test. Conversely, the tester uploads to the operational database test results and requests for items being programmed into the circuits under test. For Bluetooth IDs every circuit requires a unique ID; whereas, for customer identification, the programmed item may be the same for all circuits within a lot (e.g., 24 wafers with 500 circuits per wafer may require a single customer identification but 12000 Bluetooth IDs). The preferred embodiments have a tester download Bluetooth IDs in blocks of size 128. Any unused Bluetooth IDs at the end of a lot are simply discarded. The small size of the blocks in the tester implies little cost to discarding unused Bluetooth IDs.

The operational database for a site (including a foundry's site) acquires Bluetooth IDs from a master database in blocks of size 128K. And the master database has Bluetooth IDs stored in blocks of size 1M; see FIG. 1.

The preferred embodiment methods may waste Bluetooth IDs if the key handler task is shut down. However, by not recycling unused IDs from the tester level, this allows for a robust system which will minimize the chance of duplicate IDs being used for two different circuits.

The system of FIG. 1 operates as follows. An IC manufacturer acquires a block of 1M Bluetooth IDs or Customer Keys. A web interface is used by an engineer of (a business unit of) the IC manufacturer to input Bluetooth IDs or Customer Keys to the master database. In the case of Bluetooth, each ID has 48 bits or, equivalently, 12 hexadecimal digits. As an example, presume the block of acquired IDs consists of the range from 0x0800E7300000 to 0x0800E73FFFFF. The IDs are stored in blocks of size 128K (0x20000), That is, storing 1M IDs would add just the 8 entries 0x0800E7300000, 0x0800E7320000, 0x0800E7340000, . . . , 0x0800E73C0000, 0x0800E73E0000 to the inventory of the master database. The master database is connected to the operational databases of the various testing sites (using local/ wide area network or VPN) of the IC manufacturer (and any contract foundries) plus the manufacturer's IT systems which include entry points for the acquired IDs.

Next, an operational database at a testing site pulls one 128K block of IDs from the master database, and the corresponding entry (e.g., 0x0800E7340000) in the master database inventory is updated as "allocated" to the operational database which requested it. This pulling of a 128K block can be triggered by the inventory of available IDs at the operational database dropping to near-empty (low water mark). The operational database divides the block of 128K IDs into blocks of size 128 (0x80). Thus the inventory addition from the 128K block would initially be 0x0800E7340000, 0x0800E7340080, 0x0800E7340100, . . . , 0x0800E735FF80; a total of 1K entries. The site operational database is locally connected to the site testers, and the individual testers will pull a block of 128 IDs from the operational database as needed. This hierarchical ID storage has the following benefits:

Reduces storage requirements.
Reduces load on the databases and network.
Further minimizes the chance that an ID will be used twice.
Allows histories of the used IDs to be kept for a longer time period.

The distribution of Customer Keys, such as customer identification, encryption keys, and so forth can likewise be distributed with a master database, site operational databases, and the testers programming the information. The following section has implementation details for a typical system.

3. Implementation a. Web Interface

The web interface could be an application that can be accessed by anyone entering a valid user identification and password. In order to update the values in the Bluetooth table or the Customer Key table, the user identification must be in a list of authorized users.

The web form will enable a business unit engineer to load new Bluetooth IDs and customer/device-specific public and private keys, and to view current key status (e.g., available/allocated). Bluetooth IDs are entered in a range, same as that given by the IEEE: for example IDs in the range 080028800000-080288FFFFFF. Bluetooth IDs are stored in blocks of 128K (0x20000). Only the beginning block address is stored in the master database.

The web interface tool will verify that IDs being entered do not duplicate IDs already stored in the master database. It will also verify that the range of IDs being entered is evenly divisible by 0x20000.

Customer IDs, public keys and other key types can be loaded and/or modified using the web interface tool. Public keys are encrypted by the tool before they are stored in the master database.

The low water mark for Bluetooth IDs is set by the user using the web interface. When this mark is reached, the master database notifies the escalation list that IDs are running low and need to be replenished. One week leadtime is typically needed for getting additional IDs from the IEEE, so the low water mark should be set accordingly.

b. Master and Operational Databases

The master database holds Bluetooth IDs in blocks of 128K. The operational database pulls one or more blocks from the master database whenever a low water mark is reached. The operational database breaks up one 128K block into smaller blocks of 128 IDs. The operational database will tell the master database which site pulled the IDs for tracking purposes and keep them in a history table.

Customer keys are automatically pulled from the master database when requested; no push operation from the master database is required. If a new customer key is entered into the master database, it will be allocated to a local operational database when a tester requests it.

A stored procedure on the operational database is used by the key handler (from a tester, see below) to grab the starting address of a block of 128 Bluetooth IDs. This stored procedure updates the table containing available IDs. It will also update a history table to show which testers are being allocated the IDs. A table-level lock is made when a block is requested, guaranteeing that multiple key handlers hitting the same table will not get a duplicate block of IDs.

Tables for the master database include a table for authorized users, a table for available and allocated Bluetooth IDs and a table for current customer keys. The Bluetooth ID tables:

| Column name | Column Type | Description |
|---|---|---|
| BLUETOOTH_ID table | | |
| bluetooth_id | varchar2(30) | The starting address of the 128K Bluetooth ID block |
| user_id | varchar2(30) | User id of the person who entered the Bluetooth IDs |
| create_date | date | Date when the Bluetooth ID was entered |
| BLUETOOTH_ID_HISTORY table | | |
| bluetooth_id | varchar2(30) | The starting address of the 128K Bluetooth ID block |
| opdb_instance | varchar2(30) | Operational database instance name which grabbed the ID block (ex: ebtopdb) |
| allocated_date | date | Date when the ID block was grabbed by the opdb |
| user_id | varchar2(30) | User id of the person who entered the ID block |
| create_date | date | Date when the ID block was entered |
| BLUETOOTH_ID_LWM table | | |
| bluetooth_id_lwm | number | The low water mark (in units of 128K blocks) at which the escalation list is notified that more IDs need to be input |
| user_id | varchar2(30) | User id of the person who entered the IDs |
| entered_date | date | Date when the low water mark was entered |
| CUSTOMER_KEYS table | | |
| key_type | varchar2(30) | Type of customer key (CUSTOMER_ID, PUBLIC_KEY, etc.) |
| key_id | varchar2(30) | An ID tag in which to look up the key type |
| key_value | varchar2(30) | The actual value for a particular key_type and key_id |
| AUTHORIZED_USERS table | | |
| userid | varchar2(30) | The id of a user authorized to make changes/additions to the BLUETOOTH_IDS and CUSTOMER_KEYS tables |

The tables for the operational database include a table for available Bluetooth IDs, a table for allocated Bluetooth IDs and a table for current customer keys. A stored procedure allows the key handler task to easily pull one block of Bluetooth IDs; the procedure will take care of locking the "available" table, getting the next ID, and then it to the "allocated" table.

| Column name | Column type | Description |
|---|---|---|
| BLUETOOTH_IDS table | | |
| bluetooth_id | varchar2(30) | The starting address of the 128-number block of Bluetooth IDs |
| BLUETOOTH_ID_HISTORY table | | |
| bluetooth_id | varchar2(30) | The starting address of the 128-number Bluetooth ID block |
| tester | varchar2(30) | Tester name which grabbed the ID (ex: VLC101) |
| allocated_date | date | Date when the block was grabbed by the tester |
| CUSTOMER_KEYS table | | |
| key_type | varchar2(30) | Type of customer key (CUSTOMER_ID, PUBLIC_KEY, etc.) |
| key_id | varchar2(30) | An ID tag in which to look up the key type |
| key_value | varchar2(30) | The actual value for a particular key_type and key_id | c. Key Handler

Key handler is a daemon task running a tester. Key handler will not connect to the operational database or grab any Bluetooth IDs until the first request by the test program. Key handler connects and disconnects to the operational database as needed. It does not remain connected while in an idle state. The test program can request one or more Bluetooth IDs, which key handler requests from the operational database and returns to test program. Key handler will pull one block of 128 IDs from the operational database and keep it as cache. This way the test program can request one ID at a time without having the key handler hit the operational database every time. Also, the IDs are not recycled (unused IDs are not returned to the operational database), so uniqueness is guaranteed at the expense of discarding unused IDs in the blocks of 128.

If a customer public key is requested by the test program, the key handler will get it from the operational database, decrypt it, and then pass it back to the test program.

d. Test Program

The test program talks to the key handler task through a pair of named pipes or through a socket using a predefined set of ASCII messages. For example, the pipe names could be /tmp/twkey_in for the input pipe to send messages to the key handler and /tmp/twkey_out for the output pipe to receive messages from the key handler. A predefined set of messages types are available. KEY_REQUEST message: get a key from a particular key type (public key, customer ID, etc.) and a key ID (device name, system item ID, etc.); and BT_REQUEST message: get one or more Bluetooth IDs. All messages to key handler are responded to with an acknowledge ACK or a not acknowledge NAK, along with additional information. Note that in ASCII "ACK" is taken to be 0x06 and "NAK" is 0x15.

A NAK response message will include a reason. For example, the response could be one of:
NAK could not connect to database ebtopdb.
NAK quantity of Bluetooth IDs requested is not available.
NAK could not get PUBLIC_KEY for KEY_ID=XYZ: invalid KEY_ID name.

An example message exchange for a KEY_REQUEST is:
test program:
KEY_REQUEST KEY_TYPE=PUBLIC KEY_ID=XXX
key handler:
ACK 64A18429512C15F15

If a Bluetooth ID is needed, the test program can request one ID, which key handler will return to it. The test program can also request a number of IDs, such as a full block of 128, which the key handler will return to it as a range.

If a customer key is needed, the test program will request it by a KEY_TYPE=CUSTOMER_KEY and a KEY_ID, which the key handler will request from the operational database and return to the test program. The customer key is the same for all circuits in a lot, so the test program will only need to request it once at the beginning of the lot.

If a public key is needed (or any other key that is encrypted in the operational database), the key handler will decrypt it before giving it to the test program.

If the key handler cannot get the required number of Bluetooth IDs or a customer key, it will return a NAK to the test program.

4. Modifications

The preferred embodiments may be varied while retaining the hierarchical distribution feature. For example, the block sizes in the master database, operational databases, and testers could be varied such as block sizes 64 or 256 in a tester, 64K or 256K in an operational database, and so forth.

What is claimed is:

1. A method of distribution of tester programming items, comprising:
(a) providing a master database;
(b) providing a plurality of operational databases, each of said operational databases coupled to said master database;
(c) for each of said operational databases, providing a plurality of testers coupled to said operational database;
(d) storing in said master database a first level block of consecutive tester programming items as a plurality of second level blocks where each second level block is a subblock of consecutive items of said first level block;
(e) transferring a first of said second level blocks to a first of said operational databases, and storing said first of said second level block as a plurality of third level blocks where each third level block is a subblock of consecutive items of said first of said second level blocks; and
(f) transferring a first of said third level blocks to a first of said testers wherein said tester identifies a device utilizing said third level blocks.

2. The method of claim 1, wherein:
(a) said transferring of step (e) of claim 1 is in response to a request by said first of said operational databases when its inventory of third level blocks fails to exceed a low water mark.

3. The method of claim 1, wherein:
(a) said transferring of step (f) of claim 1 is in response to a request by said first of said testers when its inventory of tester programming items fails to exceed a low water mark.

4. The method of claim 1, wherein:
(a) said second level blocks have size 128K; and
(b) said third level blocks have size 128.

5. The method of claim 1, wherein:
(a) said tester programming items are Bluetooth identifications.

6. A computer system for tester programming items, comprising:
- (a) a processor
- (b) a master database;
- (c) plurality of operational databases, each of said operational databases coupled to said master database; and
- (d) for each of said operational databases, a plurality of testers coupled to said operational database;
- (e) wherein said master database stores a first level block of consecutive tester programming items as a plurality of second level blocks where each second level block is a subblock of consecutive items of said first level block, and wherein each of said operational databases stores a second level block as a plurality of third level blocks where each third level block is a subblock of consecutive items of a corresponding said second level block, and wherein each of said testers stores a third level block; and
- (f) wherein said master database supplies said second level blocks to said operational databases, and said operational databases supply said third level blocks to said testers wherein said tester identifies a device utilizing said third level block.

7. The system of claim 6, wherein:
- (a) one of said operational databases is operable to request a second level block from said master database when an inventory of third level blocks fails to exceed a low water mark.

8. The system of claim 6, wherein:
- (a) one of said testers is operable to request a third second level block from one of said operational database when an inventory of tester programming items fails to exceed a low water mark.

* * * * *